United States Patent
Kondo et al.

(10) Patent No.: US 9,005,740 B2
(45) Date of Patent: Apr. 14, 2015

(54) RESIN COMPOSITION FOR OPTICAL WAVEGUIDE, DRY FILM, OPTICAL WAVEGUIDE, AND PHOTOELECTRIC COMPOSITE WIRING BOARD USING SAME

(75) Inventors: Naoyuki Kondo, Osaka (JP); Junko Yashiro, Osaka (JP); Tooru Nakasiba, Osaka (JP); Shinji Hashimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/005,242

(22) PCT Filed: Mar. 30, 2012

(86) PCT No.: PCT/JP2012/002231
§ 371 (c)(1),
(2), (4) Date: Sep. 13, 2013

(87) PCT Pub. No.: WO2012/132465
PCT Pub. Date: Oct. 4, 2012

(65) Prior Publication Data
US 2014/0004321 A1    Jan. 2, 2014

(30) Foreign Application Priority Data
Mar. 31, 2011 (JP) .................. 2011-080559

(51) Int. Cl.
*B32B 27/38* (2006.01)
*G02B 1/04* (2006.01)
(Continued)

(52) U.S. Cl.
CPC .............. *G02B 1/045* (2013.01); *B32B 27/38* (2013.01); *G02B 6/1221* (2013.01); *G02B 6/138* (2013.01); *C08G 59/687* (2013.01); *C09D 163/00* (2013.01)

(58) Field of Classification Search
CPC ........... H01L 2924/0665; C09J 163/00; C08L 63/00; C09D 163/00; G02B 1/045; G02B 6/1221; G02B 6/138

USPC .................. 428/195.1, 327; 156/330; 427/386
See application file for complete search history.

(56) References Cited

U.S. PATENT DOCUMENTS

| 2007/0185300 A1 | 8/2007 | Kojima et al. |
| 2008/0085985 A1* | 4/2008 | Nakamura et al. .............. 528/25 |

(Continued)

FOREIGN PATENT DOCUMENTS

| CN | 1926455 A | 3/2007 |
| JP | 2004-286878 A | 10/2004 |

(Continued)

OTHER PUBLICATIONS

Chinese Office Action issued in Chinese Application No. 201280014625.2 dated Mar. 11, 2014.
(Continued)

*Primary Examiner* — Elizabeth Mulvaney
(74) *Attorney, Agent, or Firm* — McDermott Will & Emery LLP

(57) ABSTRACT

Provided are a resin composition which offers both high transparency and a low linear expansion coefficient and can be used as a material for a dry film, and also a dry film obtained from this composition, an optical waveguide, and a photoelectric composite wiring board. The resin composition for an optical waveguide includes: (A) an epoxy resin constituted by a solid epoxy resin with one or less hydroxyl group in a molecule, and a liquid epoxy resin with one or less hydroxyl group in a molecule; (B) a curing agent with one or less hydroxyl group in a molecule; and (C) a nanosize silica sol, and contains no compound including two or more hydroxyl groups in a molecule as a resin component.

8 Claims, 1 Drawing Sheet

(51) Int. Cl.

| | | |
|---|---|---|
| *G02B 6/122* | (2006.01) | |
| *G02B 6/138* | (2006.01) | |
| *C08G 59/68* | (2006.01) | |
| *C09D 163/00* | (2006.01) | |

(56) References Cited

U.S. PATENT DOCUMENTS

| | | |
|---|---|---|
| 2008/0226245 A1 | 9/2008 | Higuchi et al. |
| 2012/0033913 A1 | 2/2012 | Kondou et al. |

FOREIGN PATENT DOCUMENTS

| | | |
|---|---|---|
| JP | 2007-031555 A | 2/2007 |
| JP | 2008-049695 A | 3/2008 |
| JP | 2008-133442 A | 6/2008 |
| JP | 2009-040850 A | 2/2009 |
| JP | 2009-235325 A | 10/2009 |
| JP | 2010-077375 A | 4/2010 |
| JP | 2010-230944 A | 10/2010 |
| JP | 2010-275411 A | 12/2010 |
| JP | 2011-048150 A | 3/2011 |
| WO | 2005-081024 A1 | 9/2005 |

OTHER PUBLICATIONS

Search Report issued in Chinese Application No. 201280014625.2 dated Mar. 3, 2014, with English Translation.
International Search Report issued in International Application No. PCT/JP2012/002231 with Date of mailing Jul. 3, 2012.

* cited by examiner

RESIN COMPOSITION FOR OPTICAL WAVEGUIDE, DRY FILM, OPTICAL WAVEGUIDE, AND PHOTOELECTRIC COMPOSITE WIRING BOARD USING SAME

RELATED APPLICATIONS

This application is the U.S. National Phase under 35 U.S.C. §371 of International Application No. PCT/JP2012/002231, filed on Mar. 30, 2012, which in turn claims the benefit of Japanese Application No. 2011-080559, filed on Mar. 31, 2011, the disclosures of which Applications are incorporated by reference herein.

TECHNICAL FIELD

The present invention relates to a resin composition for an optical waveguide, this composition having high transparency and a low linear expansion coefficient. The present invention also relates to a dry film, an optical waveguide, and a photoelectric composite wiring board using such a resin composition.

BACKGROUND ART

Optical fibers have been widely used as a transmission medium in the field of long-range and medium-range communication for FTTH (Fiber to the Home) or automotive applications. High-speed transmission using light has recently also become a necessity for short ranges of less than 1 m. Optical wiring boards of an optical waveguide type that enable high-density wiring (narrow pitch, branching, crossing, multilayer configuration, etc.), surface mounting, integration with an electric substrate, and small-radius curving, which are the features unattainable with optical fibers, have been used in such a range.

In general, optical wiring boards of the following two types are needed. The optical wiring boards of the first type should be interchangeable with printed wiring boards (PWB), and those of the second type should be interchangeable with flexible printed substrates (FPC) used at hinges of small terminal devices.

Since the optical wiring boards of each type should enable electric wiring and low-speed signal transmission for actuating a VCSEL (Vertical Cavity Surface Emitting Laser) or PH (PhotoDiode), which is a light-receiving element, the ideal board is a photoelectric composite wiring board including an optical circuit and an electrical circuit.

To realize such a configuration, an optical waveguide should be formed on the conventional electrical circuit substrate with a small linear expansion coefficient. Meanwhile, since a resin material constituting the optical waveguide is required to be transparent, no filler can be compounded therewith. For this reason, a resin material with a high linear expansion coefficient is typically used for the optical waveguide. Therefore, an optical waveguide material with a high linear expansion coefficient is laminated on a substrate with a low linear expansion coefficient. The resultant problem is that stresses caused by the difference in linear expansion coefficients appear in the thermal history of the process or thermal history of reliability, and the substrate is warped. As a result of such warpage, stresses are applied to the mounted elements, conduction is disrupted and the chip can be fractured. Accordingly, it is desirable that a transparent resin material with a low linear expansion coefficient be used.

A resin composition in which nanosize particles are compounded with a liquid material is known as a transparent resin composition for an optical material (for example, Patent Documents 1 and 2).

Patent Document 1: Japanese Patent Application Publication No. 2009-235325

Patent Document 2: Japanese Patent Application Publication No. 2009-40850

Meanwhile, a method for forming a liquid material by spin coating or bar coating and a method for laminating a dry film material that is solid at a normal temperature with a pressing device of a vacuum laminator are typically used for forming a core layer or a clad layer constituting an optical waveguide, but the dry film material that can be used for forming a film by a vacuum laminator method is more preferred because of excellent productivity thereof.

Resin compositions including nanosize particles, such as those of the prior art described hereinabove, have been reported as liquid materials, but dry film-shaped materials that excel in transparency are presently unavailable. This is apparently because of the following problem. Thus, where two or more hydroxyl groups are present in one compound from among the resin composition, curing agent, and other additives constituting the dry film, those hydroxyl groups act together with the hydroxyl groups on the surface of nanosize particles, causing cohesion which results in white turbidity.

Where an attempt is made to remove completely the hydroxyl groups by surface treatment of the nanosize particles in order to resolve the aforementioned problem, the hydroxyl groups are difficult to remove completely because of a steric hindrance of the coupling material modifying the surface. Therefore, the white turbidity caused by cohesion is difficult to prevent.

SUMMARY OF THE INVENTION

Accordingly, it is an objective of the present invention to overcome the drawbacks and provide a resin composition for an optical waveguide which offers both high transparency and a low linear expansion coefficient and can be used as a material for a dry film, and also provide a dry film obtained from this composition, an optical waveguide, and a photoelectric composite wiring board.

The results of the comprehensive research conducted by the inventors with the object of resolving the aforementioned problems demonstrated that the problems can be resolved with the following means.

Thus, the present invention provides a resin composition for an optical waveguide, including: (A) an epoxy resin constituted by a solid epoxy resin with one or less hydroxyl group in a molecule, and a liquid epoxy resin with one or less hydroxyl group in a molecule; (B) a curing agent with one or less hydroxyl group in a molecule; and (C) a nanosize silica sol, and containing no compound including two or more hydroxyl groups in a molecule as a resin component.

In the resin composition for an optical waveguide in accordance with the present invention, the compounding ratio of the solid epoxy resin and the liquid epoxy resin in the epoxy resin (A) is preferably 90 to 70:10 to 30, as a mass ratio.

In the resin composition for an optical waveguide in accordance with the present invention, the content of the nanosize silica sol (C) is preferably 20 mass % to 80 mass %, as converted to a solid fraction of silica, with respect to the total content of the resin components.

In the resin composition for an optical waveguide in accordance with the present invention, silica with an average particle size of 5 nm to 20 nm is preferably used in the nanosize silica sol (C).

In the resin composition for an optical waveguide in accordance with the present invention, the curing agent (B) is preferably a cationic curing agent, and the silica sol (C) has a pH of 4.7 to 8.5.

The present invention also provides a dry film obtained by coating the resin composition for an optical waveguide on a base material film followed by drying.

The present invention also provides an optical waveguide constituted by the resin composition for an optical waveguide or the dry film.

The present invention also provides a photoelectric composite wiring board including the optical waveguide.

In accordance with the present invention, it is possible to provide a resin composition for an optical waveguide, which offers both high transparency and a low linear expansion coefficient and can be used as a material for a dry film. It is also possible to provide a dry film obtained from this composition, an optical waveguide with low light loss, and a photoelectric composite wiring board.

DESCRIPTION OF EMBODIMENTS

Resin Composition

Figure 1A:
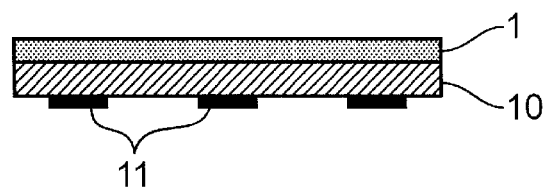
FIGS. 1A to 1F are cross-sectional schematic views for explaining a method for forming an optical waveguide on a FPC surface.

An embodiment of the present invention will be described below in greater detail.

The resin composition for an optical waveguide in accordance with the present embodiment includes: (A) an epoxy resin constituted by a solid epoxy resin with one or less hydroxyl group in a molecule, and a liquid epoxy resin with one or less hydroxyl group in a molecule; (B) a curing agent with one or less hydroxyl group in a molecule; and (C) a nanosize silica sol, and contains no compound including two or more hydroxyl groups in a molecule as a resin component.

The resin component (A) is described below.

In the present description, the expression "with one or less hydroxyl group in a molecule" means that no hydroxyl group is contained in a molecule, or where a hydroxyl group is contained, the number of the hydroxyl groups is equal to or less than 1. When a monomer is used as a constituent resin, the expression means that the monomer has one or less hydroxyl group. When an oligomer is used, the expression means that the oligomer has one or less hydroxyl group. When a polymer is used, the expression means that the polymer has one or less hydroxyl group.

Examples of solid epoxy resins with one or less hydroxyl group in a molecule that can be used in the present embodiment include alicyclic solid epoxy resins and solid novolak epoxy resins. Commercially available resins may be used. Examples of suitable resins include EHPE-3150 manufactured by Daicell Chemical Industries, Ltd. and EPPN201, EPPN502H manufactured by NIPPON KAYAKU Co., Ltd.

Specific examples of the liquid epoxy resins with one or less hydroxyl group in a molecule include bisphenol A epoxy resins, bisphenol F epoxy resins, hydrogenated bisphenol A epoxy resins, hydrogenated bisphenol F epoxy resins, alicyclic epoxy resins, biphenyl epoxy resins, novolac epoxy resins, trimethylolpropane epoxy resins, and polyethylene glycol epoxy resins. Commercially available resins may be used. Examples of suitable resins include EPOTOHTO YH300 manufactured by New Nippon Steel Chemical Co., Ltd., Epikote YX8000 manufactured by Mitsubishi Chemical Corporation, and EPICLON 850s manufactured by Dainippon Inks and Chemicals, Incorporated.

An epoxy resin constituted by a solid epoxy resin with one or less hydroxyl group in a molecule, and a liquid epoxy resin with one or less hydroxyl group in a molecule is used as the epoxy resin (A). Since such an epoxy resin is used, the total amount of hydroxyl groups in the resin component that interacts with nanosize silica gel is controlled, and a dry film and a base material having better transparency and lower linear expansion coefficient can be obtained. Further, flexibility can be provided by the dry film, the occurrence of cracks in handling can be inhibited, and excellent handleability is achieved.

Further, it is preferred that the epoxy resin (A) be compounded such that the compounding ratio of the solid epoxy resin with one or less hydroxyl group in a molecule and the liquid epoxy resin with one or less hydroxyl group in a molecule is 90 to 70:10 to 30. Where the amount of the liquid component is small, the dry film has insufficient bending ability and tackiness, and where the amount of the liquid component is large, the tackiness increases, the dry film is difficult to handle, or handleability is lost.

The content ratio of the epoxy resin (A) such as described hereinabove is preferably within a range of 20 mass % to 80 mass %, more preferably within a range of 40 mass % to 70 mass % with respect to the total content of the resin composition.

The curing agent (B) with one or less hydroxyl group in a molecule is a polymerization initiator for polymerizing the resin such as described hereinabove, and for example a photo-curing agent that can initiate curing under light irradiation (a photo-acid generator generating an acid under light irradiation, a photo-base generator that generates a base under light irradiation, and the like), a thermo-curing agent that can initiate curing under heating (a thermo-acid generator that generates an acid under heating, a thermo-base generator that generates a base under heating), or a photo-thermo curing agent that can initiate curing under light irradiation or heating can be used. Among them, where a cationic curing agent is used, the transparency can be further increased and light loss can be reliably reduced.

Commercially available curing agents with one or less hydroxyl group in a molecule can be used. Specific examples of commercial products include "CPI101A" (4-diphenylsulfonio diphenylsulfide hexafluoroantimonate) and CPI200K (chemical name: triarylsulfonium salt) manufactured by San-Apro Ltd. and "SI-150L" (SbF6-system sulfonium salt) manufactured by SANSHIN CHEMICAL INDUSTRY CO., LTD.). Those curing agents may be used individually or in combinations of two or more thereof.

For example, the compounding ratio of such curing agent (B) is within a range of 0.5 mass % to 5 mass %, more preferably within a range of 1 mass % to 3 mass %. The compounding ratio is preferably equal to or higher than 0.5 mass %, because the curing of the resin is sufficient and a hard cured product is obtained. The compounding ratio is preferably equal to or less than 5 mass % because where the content ratio of the curing agent is excessively high, curing strains are easily generated and the cured product becomes brittle due to the increase in the amount of component that does not react with the remaining acid or base and the cured product.

Further, in the present embodiment, a dispersion obtained by dispersing silica with an average particle size within a range of 5 nm to 20 nm in an organic solvent as a dispersion medium to obtain a solid fraction ratio of 10 mass % to 40 mass % (colloidal silica dispersed in organic solvent) can be used as the nanosize silica sol (C). Methyl ethyl ketone, methyl isobutyl ketone, propylene glycol monomethyl ether, and propylene glycol monomethyl ether acetate can be used as the organic solvent. Where such nanosize silica sol using silica with an average particle size within a range of 5 nm to 20 nm is used, transparency of the resin can be reliably obtained and therefore a resin material that excels in transparency and has a small linear expansion coefficient can be obtained.

The nanosize silica sol is not particularly limited, provided that it has the above-described properties, and commercially available products can be also used. For example, a "MEK-ST" series manufactured by Nissan Chemical Industries, Ltd. and "ADMAFINE" manufactured by Admatechs Company Limited can be used as colloidal silica dispersed in organic solvent. The particle surface thereof may be modified with a silane compound obtained using chlorosilane, alkoxysilane, or the like as a starting material. In addition, an additive such as a pH adjusting agent or a dispersant can be compounded.

In particular, when a cationic curing agent is used as the aforementioned curing agent (B), it is preferred that silica sol with pH within a range of 4.7 to 8.5 be used. As a result, it is possible to obtain a resin composition that excels in transparency and also excels in long service life and handleability. The pH of the silica sol can be adjusted to this range by adding a pH adjusting agent such as sulfuric acid, a carboxylic acid, and ammonia.

The compounding ratio of such nanosize silica sol (C) is, for example, within a range of 20 mass % to 80 mass %, more preferably, within a range of 30 mass % to 60 mass %, as converted to a silica solid fraction, with respect to the total content of the resin composition. Where the compounding ratio is equal to or higher than 20 mass %, a low linear expansion coefficient can be obtained, and where the compounding ratio is equal to or lower than 80 mass %, the base material does not become too brittle, and an excellent base material is obtained.

The resin composition for an optical waveguide of the present embodiment may contain, as necessary, other additives, for example, a curing accelerator, a flame retardant, a flame retardant promoter, a leveling agent, and a colorant, within ranges in which the effects of the present invention are not lost. However, in accordance with the present invention, where a resin component other than the above-described necessary component is additionally included, it is important not to use a compound having two or more hydroxyl groups in a molecule. This is because where a compound having two or more hydroxyl groups in a molecule is included in the resin composition, the amount of hydroxyl groups becomes too large, and the effects of the present invention can be lost.

(Method for Manufacturing Resin Composition)

The resin composition for an optical waveguide in accordance with the present invention is usually prepared and used in the form of a varnish. The varnish is prepared, for example, in the following manner.

Thus, the resin composition is obtained by using a varnish obtained by dissolving the above-described resin (A) at a predetermined ratio in a solvent and then compounding the curing agent (B) and silica sol (C) and selecting the ratio such that a compound which is solid at a normal temperature is obtained by drying the varnish to remove the solvent. The mixing ratio of the resin component and the solvent in the varnish is not particularly limited and may be adjusted, as appropriate, so as to obtain a viscosity suitable for coating (loading) in a varnish state on the base material surface.

The organic solvent is not particularly limited, and the examples of suitable organic solvents include aromatic hydrocarbons such as benzene and toluene, amides such as N,N-dimethylformamide (DMF), and ketones such as acetone and methyl ethyl ketone.

The temperature at which the resin component is dissolved in the solvent is about 50° C. to 100° C.

In order to form an optical waveguide by using the resin composition such as described hereinabove, a cured layer may be formed by using a coating step of directly coating the varnish on a substrate surface and then drying, but from the standpoint of productivity, it is preferred that a dry film formed in advance from the above-described resin composition be used. Where such a dry film is used, the complex coating step becomes unnecessary and an optical waveguide can be manufactured with high productivity. Another advantage of using the dry film is that the optical waveguide can be formed with uniform thickness accuracy.

(Dry Film)

The dry film according to the present embodiment is formed, for example, by coating with a multi-coater having a comma coater head on the surface of a film base material such as a PET film and drying the coating. A dry film with a thickness of about 10 μm to 100 μm can be obtained by thermally laminating a polypropylene film or the like as a release film.

(Optical Waveguide)

An embodiment in which an optical waveguide is formed on a substrate by using such a dry film will be explained below in greater detail with reference to FIG. 1.

When an optical waveguide is formed, a clad curable film and a core curable film are used to form a core and a clad. The refractive index of the clad curable film is adjusted to be lower than the refractive index of the core curable film.

Figure 1B:
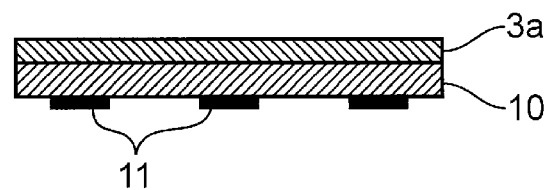

Initially, as shown in FIG. 1A, a clad curable film 1 is laminated on the surface of a substrate 10 where an electric circuit 11 has been formed, and then the clad curable film 1 is cured by light irradiation such as ultraviolet radiation or heating. For example, a flexible printed wiring board in which an electric circuit is formed on one surface of a transparent base material such as a polyimide film is used as the substrate 10. In such a step, an under-clad 3a is formed by lamination on the surface of the substrate 10, as shown in FIG. 1B.

Figure 1C:
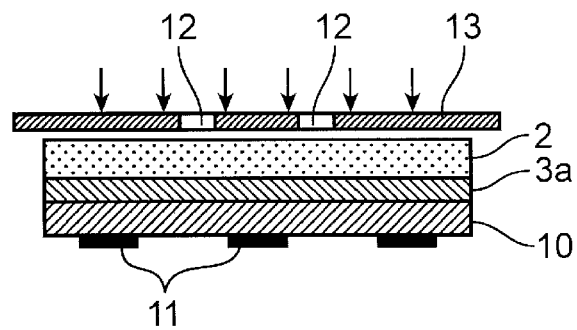

Then, as shown in FIG. 1C, a core curable film 2 is laminated on the surface of the under-clad 3a, then a mask 13 having a slit 12 of a core pattern is placed thereon, and the core photocurable film 2 is exposed in the core pattern by irradiating through the slit 12 with light suitable for photocuring, such as ultraviolet radiation. The exposure may be performed not only by a selective exposure method using a mask, but also by a direct drawing method in which a laser beam is scanned according to the pattern shape.

Figure 1D:
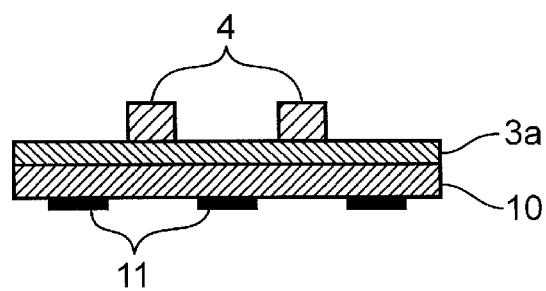

After the exposure, the core photocurable film 2 is developed by using a developing liquid such as an aqueous flux detergent, thereby removing the resin of the unexposed and non-cured portion of the core photocurable film 2. As a result, a core 4 of a predetermined core pattern is formed on the surface of the under-clad 3a, as shown in FIG. 1D.

Figure 1E:
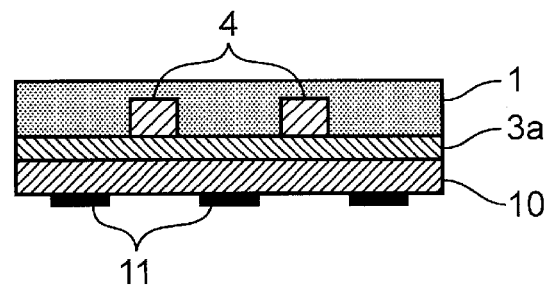
Figure 1F:
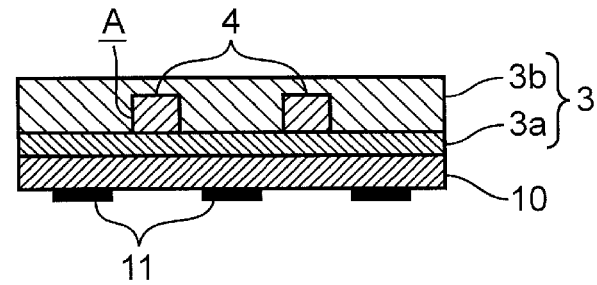

Then, as shown in FIG. 1E, the clad curable film 1 is laminated to as to cover the under-clad 3a and the core 4. An over-clad 3b such as shown in FIG. 1F is then formed by curing the clad curable film 1 by light irradiation or heating. An optical waveguide A in which the core 4 is embedded in the clad 3 constituted by the under-clad 3a and the over-clad 3b is thus formed on the surface of the substrate 10.

The optical waveguide A thus formed on the surface of the substrate 10 has high resistance to bending. The substrate 10 with such an optical waveguide A formed thereon can be advantageously used as a flexible printed wiring board for light transmission. For example, it can be advantageously used for cellular phones and portable information terminals.

The present embodiment will be explained below in greater detail by examples thereof. The present invention is not limited to the below-described examples.

EXAMPLES

Materials used in the preparation of the epoxy resin compositions of the examples are listed below.

<Resins>

Liquid epoxy resin with one or less hydroxyl group in a molecule, "EPICLON 850s" (manufactured by DIC Corporation).

Liquid epoxy resin with one or less hydroxyl group in a molecule, "YH300" (manufactured by New Nippon Steel Chemical Co., Ltd.).

Solid epoxy resin with one or less hydroxyl group in a molecule, "EHPE3150" (manufactured by Daicell Chemical Industries, Ltd.).

Solid epoxy resin with one or less hydroxyl group in a molecule, "EPPN201" (manufactured by NIPPON KAYAKU Co., Ltd.).

Solid epoxy resin with one or less hydroxyl group in a molecule, "EPPN502H" (manufactured by NIPPON KAYAKU Co., Ltd.).

Solid epoxy resin with two or more hydroxyl groups in a molecule, "YX8040" (manufactured by Mitsubishi Chemical Corporation).

Solid epoxy resin with two or more hydroxyl groups in a molecule, "1006FS" (manufactured by Mitsubishi Chemical Corporation).

<Curing Agents>

Photocationic curing agent with one or less hydroxyl group in a molecule, "CPI101A" (manufactured by San-Apro Ltd.).

Photocationic curing agent with zero hydroxyl groups in a molecule, "SI-150L" (manufactured by SANSHIN CHEMICAL INDUSTRY CO., LTD.).

Photocationic curing agent with two or more hydroxyl groups in a molecule, "SP170" (manufactured by ADEKA CORPORATION).

<Nanosize Silica Sol>

Silica sols (sol A to sol E) having pH shown in Table 1 below were prepared by using MEK-ST (dispersion of silica sol with an average particle size of 12 nm in methyl ethyl ketone), manufactured by Nissan Chemical Industries, Ltd., as a base sol and treating the base sol with a pH adjusting agent. Silica sols (sol F to sol H) shown in Table 2 were prepared by using MEK-20 nm (dispersion of silica sol with an average particle size of 20 nm in methyl ethyl ketone), MEK-ST-L (dispersion of silica sol with an average particle size of 45 nm in methyl ethyl ketone), and MEK-ST-ZL (dispersion of silica sol with an average particle size of 83 nm in methyl ethyl ketone), manufactured by Nissan Chemical Industries, Ltd., as a base sol.

Further, a pH evaluation liquid was prepared by compounding the sol, methanol, and water at a 1:1:1 ratio and dissolving, the pH value of the evaluation liquid was measured with a pH meter, and the value obtained was taken as the pH value of the silica sol.

TABLE 1

| | Base sol MEK-ST | | | | | |
|---|---|---|---|---|---|---|
| | | Product number after treatment | | | | |
| | MEK-ST | Sol A | Sol B | Sol C | Sol D | Sol E |
| Particle size (nm) | 12 | 12 | 12 | 12 | 12 | 12 |
| Silica solid fraction (mass %) | 30 | 31 | 31 | 31 | 31 | 31 |
| Dispersant | MEK | MEK | MEK | MEK | MEK | MEK |
| pH | 3-4 | 8.2 | 7.2 | 6.2 | 4.9 | 4.7 |

TABLE 2

| Base sol | MEK-20 nm | MEK-ST-L | MEK-ST-ZL |
|---|---|---|---|
| Product number after treatment | Sol F | Sol G | Sol H |
| Particle size (nm) | 20 | 45 | 83 |
| Silica solid fraction (mass %) | 31 | 31 | 31 |
| Dispersant | MEK | MEK | MEK |
| pH | 7.8 | 8.5 | Not evaluated |

Test Example 1

Evaluation of Dry Film

1. Composition of Resin

Examples 1 to 4

The components were compounded in compositions (parts by mass) such as shown in Table 3 below and were mixed under reflux conditions and heating at 80° C. Then, methyl ethyl ketone (MEK) was distilled off under reduced pressure to obtain 70 parts by mass thereof per 100 parts by mass of the solid fraction. An epoxy resin varnish was prepared by filtration with a membrane filter with a pore size of 1 μm and then defoaming under reduced pressure. In all of the tables below, the compounded amount of silica sol is shown by the weight of silica particles after the solvent has been removed.

Dry films with a thickness of 10 μm and 50 μm were obtained by coating the varnish on a PET film (product number A4100) manufactured by Toyo Boseki Kabushiki Kaisha by using a multi-coater with a comma coater head manufactured by HIRANO TECSEED Co., Ltd., drying to obtain a predetermined thickness, and thermally laminating a release film OPP-MA420 manufactured by Oji Specialty Paper Co., Ltd.

Examples 5 and 6

Dry films were obtained in the same manner as in Example 1, except that the components were compounded in compositions (parts by mass) such as shown in Table 4 below.

Comparative Examples 1 to 4

Dry films were obtained in the same manner as in Example 1, except that the components were compounded in compositions (parts by mass) such as shown in Table 5 below.

<Evaluation>

(Evaluation of Transparency)

The release films of the dry films fabricated in Examples 1 to 4 were peeled off, the peeled surfaces were exposed at a quantity of light of 4 J/cm² with an ultrahigh-pressure mercury lamp, and heat treatment was performed for 1 hour at 150° C. The transparency of the cured films was visually checked. The results demonstrated that all of the cured films were transparent. The samples with a filler content ratio of 60 mass %, 70 mass %, and 80 mass % were also confirmed to be transparent (the results are not shown in the table).

Likewise, the release film of the dry film fabricated in Example 5 was peeled off, the peeled surface was exposed at a quantity of light of 4 J/cm² with an ultrahigh-pressure mercury lamp, and heat treatment was performed for 1 hour at 150° C. The transparency of the cured film was visually checked. The results demonstrated that the cured film was transparent.

Further, the release film of the dry film fabricated in Example 6 was peeled off, and heat treatment was performed for 1 hour at 150° C. The transparency of the cured film was visually checked. The results demonstrated that the cured film was transparent.

The release films of the dry films fabricated in Comparative Examples 1 to 4 were also peeled off, the peeled surfaces were exposed at a quantity of light of 4 J/cm² with an ultrahigh-pressure mercury lamp, and heat treatment was performed for 1 hour at 150° C. The transparency of the cured films was visually checked. All of the cured films demonstrated white turbidity (white turbidity was very small only in Comparative Example 3).

(Evaluation of Linear Expansion Coefficient)

The release films of the dry films fabricated in Examples 1 to 5 were peeled off, the peeled surfaces were exposed at a quantity of light of 4 J/cm² with an ultrahigh-pressure mercury lamp, and heat treatment was performed for 1 hour at 150° C. The release film of the dry films fabricated in Example 6 was also peeled off, and heat treatment was performed for 1 hour at 150° C.

After the heat treatment, PET was peeled off and removed, the cured films were cut to the size of 5 mm×50 mm, and the linear expansion coefficient was measured with EXSTAR 6000 manufactured by Seiko Instruments Inc. The results are shown in Table 3 and Table 4.

TABLE 3

| Composition | Used material | Example 1 | Example 2 | Example 3 | Example 4 |
|---|---|---|---|---|---|
| Solid epoxy resin | EHPE3150 | 56 | 56 | 48 | 40 |
| Liquid epoxy resin | YH300 | 5.6 | 5.6 | 4.8 | 4 |
|  | 850s | 8.4 | 8.4 | 7.2 | 6 |
| Nanosize silica sol | MEK-ST | 30 | — | — | — |
|  | Sol A | — | 30 | 40 | 50 |
| Curing agent | CPI101A | 3 | 1 | 2 | 2 |
| Linear expansion coefficient | ppm/° C. | 55 | 54 | 49 | 43 |
| Transparency Dry film |  | Transparent Obtained | Transparent Obtained | Transparent Obtained | Transparent Obtained |

TABLE 4

| Composition | Used material | Example 5 | Example 6 |
|---|---|---|---|
| Solid epoxy resin | EHPE3150 | — | — |
|  | EPPN201 | 56 | — |
|  | EPPN502H | — | 56 |
| Liquid epoxy resin | YH300 | 5.6 | 5.6 |
|  | 850s | 8.4 | 8.4 |
| Nanosize silica sol | Sol A | 30 | 30 |
| Cationic curing initiator | CPI101A | 0.5 |  |
|  | SI150L | 0.5 | 1 |
| Linear expansion coefficient | ppm/° C. | 54 | 55 |
| Transparency Dry film |  | Transparent Obtained | Transparent Obtained |

TABLE 5

| Composition | Used material | Comparative Example 1 | Comparative Example 2 | Comparative Example 3 | Comparative Example 4 | Comparative Example 5 |
|---|---|---|---|---|---|---|
| Solid epoxy resin | EHPE3150 | — | — | — | 56 | 80 |
| Solid epoxy resin with two or more hydroxyl groups | YX8040 | 56 | 56 | — | — | — |
|  | 1006FS | — | — | 56 | — | — |
| Liquid epoxy resin | YH300 | 5.6 | 5.6 | 5.6 | 5.6 | 8 |
|  | 850s | 8.4 | 8.4 | 8.4 | 8.4 | 12 |
| Nanosize silica sol | MEK-ST | 30 | — | — | — | — |
|  | Sol A | — | 30 | 30 | 30 | — |
| Curing agent | CPI101A | 1 | 1 | 1 | — | — |
| Curing agent with two or more hydroxyl groups | SP170 | — | — | — | 1 | — |
| Linear expansion coefficient | ppm/° C. | — | — | — | — | 70 |

TABLE 5-continued

| Composition | Used material | Comparative Example 1 | Comparative Example 2 | Comparative Example 3 | Comparative Example 4 | Comparative Example 5 |
|---|---|---|---|---|---|---|
| Transparency | | White turbidity | White turbidity | Slight white turbidity | White turbidity | White turbidity |

Thus, it is clear that a cured resin composition constituted by a resin composition and a curing agent, each having one or less hydroxyl group in a molecule, and nanosize silica particles excels in transparency, has a small linear expansion coefficient, and makes it possible to obtain a dry film.

Since white turbidity was observed in Comparative Examples 1 to 4, the linear expansion coefficient was not measured. In Comparative Example 5 in which nano-order silica particles were not included, the transparency was obtained, but the linear expansion coefficient was high.

2. Particle Size of Silica Sol

Examples 7 and 8 and Comparative Examples 6 and 7

The components were compounded in compositions (parts by mass) such as shown in Table 6 below and were mixed under reflux conditions and heating at 80° C. Then, MEK was distilled off under reduced pressure to obtain 70 parts by mass thereof per 100 parts by mass of the solid fraction. An epoxy resin varnish was prepared by filtration with a membrane filter with a pore size of 1 μm and then defoaming under reduced pressure.

Dry films with a thickness of 50 μm were obtained by coating the varnish on a PET film (product number A4100) manufactured by Toyo Boseki Kabushiki Kaisha by using a multi-coater with a comma coater head manufactured by HIRANO TECSEED Co., Ltd., drying to obtain a predetermined thickness, and thermally laminating a release film OPP-MA420 manufactured by Oji Specialty Paper Co., Ltd.

<Evaluation>

(Evaluation of Transparency)

The transparency of the obtained dry films was visually checked. The dry films of Examples 7 and 8 were confirmed to be transparent, but white turbidity was observed in dry films of Comparative Examples 6 and 7.

(Evaluation of Linear Expansion Coefficient)

The linear expansion coefficient of the dry films of Examples 7 and 8 was measured by the above-described method. The results are shown in Table 6.

TABLE 6

| Composition | Used material | Particle size | Example 7 | Example 8 | Comparative Example 6 | Comparative Example 7 |
|---|---|---|---|---|---|---|
| Solid epoxy resin | EHPE3150 | | 56 | 40 | 56 | 56 |
| Liquid epoxy resin | YH300 | | 5.6 | 4 | 5.6 | 5.6 |
| | 850s | | 8.4 | 6 | 8.4 | 8.4 |
| Nanosize silica sol | Sol F | 20 nm | 30 | 50 | — | — |
| | Sol G | 43 nm | — | — | 30 | — |
| | Sol H | 83 nm | — | — | — | 30 |
| Cationic curing initiator | CPI101A | | 2 | 2 | 2 | 2 |
| Transparency | | | Transparent | Transparent | White turbidity | White turbidity |
| Linear expansion coefficient | ppm/° C. | | 53 | 45 | — | — |
| Dry film | | | Obtained | Obtained | — | — |

Thus, it was established that when the filler size is greater than 20 nm, the material demonstrates white turbidity and transparency cannot be ensured. Therefore, it is preferred that the filler size be equal to or less than 20 nm.

3. pH of Silica Sol

Examples 9 to 12 and Comparative Example 8

Dry films were obtained in the same manner as in Example 1, except that the components were compounded in compositions (parts by mass) such as shown in Table 7 below.

The transparency (visual), possibility of producing a dry film, and storage life were evaluated by using the obtained dry films. The storage life was determined by whether or not precipitates appear or gelling occurs after a predetermined period of time elapses.

The results are shown in Table 7.

TABLE 7

| Composition | Used material | pH | Example 9 | Example 10 | Example 11 | Example 12 | Comparative Example 8 |
|---|---|---|---|---|---|---|---|
| Solid epoxy resin | EHPE3150 | | 40 | 40 | 40 | 40 | 40 |

TABLE 7-continued

| Composition | Used material | pH | Example 9 | Example 10 | Example 11 | Example 12 | Comparative Example 8 |
|---|---|---|---|---|---|---|---|
| Liquid epoxy resin | YH300 | | 4 | 4 | 4 | 4 | 4 |
| | 850s | | 6 | 6 | 6 | 6 | 6 |
| Nanosize silica sol | Sol E | 4.7 | | | | | 50 |
| | Sol D | 4.9 | 50 | | | | |
| | Sol C | 6.2 | | 50 | | | |
| | Sol B | 7.2 | | | 50 | | |
| | Sol A | 8.2 | | | | 50 | |
| Cationic curing initiator | CPI101A | | 2 | 2 | 2 | 2 | 2 |
| Transparency | | | Transparent | Transparent | Transparent | Transparent | Transparent |
| Dry film | | | Obtained | Obtained | Obtained | Obtained | Obtained |
| Storage life | | | Good | Good | Good | Good | Precipitates |

The results obtained demonstrated that no problems were associated with transparency and dry film properties. However, in the dry film of Comparative Example 8, although no problems were observed at the initial stage, a problem was associated with the storage life. Thus, when pH was equal to or less than 4.7, the composition was transparent immediately after compounding, but when it was observed again after 2 days, precipitates appeared or gelling occurred in the epoxy resin compounded with silica sol. This is apparently because silica sol is acidic and therefore interacts with the epoxy resin. It was thus found out that excellent transparency and also long life and excellent handleability are obtained when the pH of the silica sol is equal to or greater than 4.9.

The cured products of Example 2 and Example 4 (both used silica sol A with pH 8.2) was subjected to a wiping test with acetone. No defects were obtained after wiping. Meanwhile, when the concentration of the curing agent in Example 4 was changed to 1% and the cured product was subjected to the wiping test with acetone, scratches indicating curing defects were obtained after wiping. This is apparently because where a compounded sol amount is increased when pH is large, the effectiveness of the cationic curing agent is lost. Therefore, it was found out that by reducing pH to a value equal to or less than 8.5, the loss of the curing gent effectiveness was inhibited and excellent curing ability of the nano-filler-containing epoxy resin was obtained.

Test Example 2

Evaluation of Optical Waveguide

1. Optical Waveguide

Examples 13 to 15

(Preparation of Material for Optical Waveguide)

First, the following core dry film was prepared as a core material for an optical waveguide.

An epoxy resin varnish was prepared by dissolving 8 parts by mass of CELLOXIDE 2021P (abbreviated as CEL2021P, manufactured by Daicell Chemical Industries, Ltd.), which is 3,4-epoxycyclohexenylmethyl-3',4'-epoxycyclohexene carboxylate, 12 parts by mass of EHPE 3150 (manufactured by Daicell Chemical Industries, Ltd.) as an epoxy resin, which is a 1,2-epoxy-4-(2-oxylanyl)cyclohexane adduct of 2,2-bis (hydroxymethyl)-1-butanol, 37 parts by mass of Epikote 1006FC (manufactured by Japan Epoxy Resin Co., Ltd.), which is a solid bisphenol A epoxy resin, 15 parts by mass of VG-3101 (manufactured by Mitsui Chemicals, Inc.), which is a tri-functional epoxy resin, 18 parts by mass of EPPN 201 (manufactured by NIPPON KAYAKU Co., Ltd.), which is a solid novolac epoxy resin, 10 parts by mass of EPICLON 850s (manufactured by DIC Corporation), which is a liquid bisphenol A epoxy resin, 1 part by mass of SP-170 (manufactured by ADEKA CORPORATION), which is a photocationic curing initiator, and 0.1 parts by mass of F470 (manufactured by DIC Corporation), which is a surface modificator, as compounding components in a solvent containing 30 parts by mass of toluene and 70 parts by mass of MEK, filtering the solution with a membrane filter with a pore size of 1 μm, and defoaming under reduced pressure. A film was obtained by coating the varnish on a PET film (product number A4100) manufactured by Toyo Boseki Kabushiki Kaisha by using a multi-coater with a comma coater head manufactured by HIRANO TECSEED Co., Ltd., drying to obtain a predetermined thickness, and thermally laminating a release film OPP-MA420 manufactured by Oji Specialty Paper Co., Ltd.

(Formation of Optical Waveguide)

A clad curable film with a thickness of 10 μm was used and laminated with a vacuum laminator "V-130" under the conditions of 60° C. and 0.2 MPa on a substrate (R1766, manufactured by Panasonic Electric Works Co., Ltd.) obtained by etching off copper on both surfaces. The clad curable film was then irradiated with ultraviolet radiation under a condition of 2 J/cm$^2$ with an ultrahigh-pressure mercury lamp, the release film was peeled off, heat treatment was conducted for 30 min at 150° C., oxygen plasma treatment was performed, and the clad curable film was cured to form an under-clad.

Then, the core photocurable film with a thickness of 35 μm was used, and this core photocurable film was laminated with the vacuum laminator "V-130" on the under-clad surface under the same conditions as described above.

A negative mask having formed therein a slit of a linear pattern with a width of 35 μm and a length of 120 mm was then placed on the surface of the core photocurable film, exposure was conducted by irradiation with ultraviolet radiation with an ultrahigh-pressure mercury lamp under a condition of 3 J/cm$^2$, and the portion of the photocurable film corresponding to the slit was photocured.

The release film was then peeled off from the pohotocurable film, and heat treatment was performed for 2 min at 140° C. The development was then performed using an aqueous flux detergent ("PINE ALPHA ST-100SX", manufactured ARAKAWA CHEMICAL INDUSTRIES, LTD.) adjusted to a temperature of 55° C. as a developing liquid to dissolve and remove the unexposed portion of the photocurable film. The core was then formed by finish washing with water, air blowing, and then drying for 10 min at 100° C.

The clad curable film with a thickness of 50 μm was then used, and this clad curable film was laminated with the vacuum laminator "V-130" from above the core under the conditions of 80° C. and 0.3 MPa. An optical waveguide was then formed by exposure with an ultrahigh-pressure mercury lamp at a quantity of light of 2 J/cm², heat treatment for 1 hour at 150° C. and curing of the clad curable film.

Optical waveguides of Examples 13 to 15 were obtained by using the films of Examples 2 to 4, respectively, as the clad curable film.

(Loss Evaluation of Optical Waveguides)

A sample was cut to a length of 100 mm prior to measurements and the end surfaces were polished.

The end portion of the optical waveguide was irradiated via silicone oil as a matching oil with light from a 850-nm VCSEL light source through an optical fiber with an NA of 0.21 and a core diameter of 10 μm. The opposite end was connected to a power meter through an optical fiber with a core diameter of 200 μm and an NA of 0.4 via the same matching oil. The power (P1) was measured in the case in which an optical circuit was inserted at the incidence end surface and the outgoing end surface, the power (P0) was measured in a state in which the two fibers were abutted against each other and no optical circuit used for measurements was inserted, and the optical circuit insertion loss was calculated by the formula −10 log(P1/P0). It was confirmed that the loss observed when the materials of Example 2, Example 3, and Example 4 were clad was: 0.8 dB (Example 13), 1 dB (Example 14), and 1 dB (Example 15) and that the optical waveguides suitable for practical use could be produced.

2. Optical Waveguide Equipped with Mirror

Example 16 and Comparative Example 9

Formation of Optical Waveguide

A clad curable film of Example 2 with a thickness of 10 μm was used and laminated with a vacuum laminator "V-130" under the conditions of 60° C. and 0.2 MPa on a substrate (R1766, manufactured by Panasonic Electric Works Co., Ltd.) obtained by etching off copper on both surfaces. The clad curable film was then irradiated with ultraviolet radiation under a condition of 2 J/cm² with an ultrahigh-pressure mercury lamp, the release film was peeled off, heat treatment was conducted for 30 min at 150° C., oxygen plasma treatment was performed, and the clad curable film was cured to form an under-clad.

Then, the core photocurable film with a thickness of 35 μm was used, and this core photocurable film was laminated with the vacuum laminator "V-130" on the under-clad surface under the same conditions as described above.

A negative mask having formed therein a slit of a linear pattern with a width of 35 μm and a length of 120 mm was then placed on the surface of the core photocurable film, exposure was conducted by irradiation with ultraviolet radiation with an ultrahigh-pressure mercury lamp under a condition of 3 J/cm², and the portion of the photocurable film corresponding to the slit was photocured.

The release film was then peeled off from the pohotocurable film, and heat treatment was performed for 2 min at 140° C. The development was then performed using an aqueous flux detergent ("PINE ALPHA ST-100SX", manufactured ARAKAWA CHEMICAL INDUSTRIES, LTD.) adjusted to a temperature of 55° C. as a developing liquid to dissolve and remove the unexposed portion of the photocurable film. The core was then formed by finish washing with water, air blowing, and then drying for 10 min at 100° C.

(Formation of Mirror)

A micro-mirror for 90°-polarization of light in the waveguide was then formed. Thus, a rotating blade ("#5000 BLADE" manufactured by DISCO CORPORATION) with an apex angle of the cutting edge of 45° was used and a 45°-plane was processed so as to cut completely at least the core by moving the blade so as to cut across to positions at 10 mm from both ends of the core under the conditions of a revolution speed of 10,000 rpm and a movement speed of 0.1 mm/s. A solution prepared by 50-fold dilution of the varnish of the "clad material" with a solvent including toluene and MEK at a ratio of 3:7 was then thinly coated with a brush on the 45°-plane, drying was performed for 30 min at 100° C., then exposure was conducted by irradiation with ultraviolet radiation with an ultrahigh-pressure mercury lamp under a condition of 1 J/cm², and then heat treatment was performed for 10 min at 120° C., thereby smoothing the 45°-plane.

(Formation of Metal Film)

Then, a micro-mirror was formed with a thin gold film with a thickness of 1000 Å on the surface of a V groove by vacuum vapor depositing gold through a metal mask in which only a V-groove portion was open.

(Formation of Clad)

The dry films of Example 2 and Comparative Example 5 that had a thickness of 50 μm were then used as clad curable films, and those clad curable films were laminated with the vacuum laminator "V-130" from above the core under the conditions of 80° C. and 0.3 MPa. Optical waveguide of Example 16 (dry film of Example 2 was used) and optical waveguide of Comparative Example 9 (dry film of Comparative Example 5 was used) were then formed by exposure with an ultrahigh-pressure mercury lamp at a quantity of light of 2 J/cm², heat treatment for 1 hour at 150° C. and curing of the clad curable films.

<Evaluation>

(Evaluation of Substrate Warpage)

The results demonstrated that the optical waveguide substrate fabricated from the resin composition of Comparative Example 9 which did not include silica sol had large warpage, whereas a printed wiring board having formed thereon an optical waveguide constituted by the resin composition of Example 16 that contained silica sol demonstrated practically no warpage. This is because compounding with silica sol reduced curing-induced shrinkage of the resin.

Thus by using the resin composition in accordance with the present invention, it is possible to obtain an optical waveguide substrate with small warpage. This result is effective in terms of subsequent element mounting ability and warpage reduction when the substrate size is increased.

(Loss Evaluation of Optical Waveguide Equipped with Mirror)

The mirror at one side of the optical circuit of the optical waveguide was irradiated via silicone oil as a matching oil with light from a 850-nm VCSEL light source through an optical fiber with a core diameter of 10 μm and an NA of 0.21. The opposite side was connected to a power meter through an optical fiber with a core diameter of 200 μm and an NA of 0.4 via the same matching oil. The power (P1) was measured in the case in which an optical circuit was inserted at the mirror incidence and outgoing sides, the power (P0) was measured in a state in which the two fibers were abutted against each other and no optical circuit used for measurements was inserted, and the optical circuit insertion loss was calculated by the formula −10 log(P1/P0). The loss in this case was 3 dB and the optical waveguides suitable for practical use could be produced.

(Reliability Evaluation of Optical Waveguides)

A thermal cycling test was performed with respect to the optical waveguide substrate of Example 16. In the test, a cycle of holding for 15 min at −55° C., raising the temperature, and holding for 15 min at 125° C. was repeated 1,000 times. When the loss before the test was compared with that after the test, no change in the loss was found.

This is apparently because the stresses between the substrate and the optical waveguide were reduced because of a small linear expansion coefficient of the optical waveguide. Thus, it is clear that the resin composition in accordance with the present invention can be advantageously used for a photoelectric composite wiring board laminated on a printed wiring board with a small linear expansion coefficient.

As described hereinabove, the resin composition for an optical waveguide in accordance with the present invention includes: (A) an epoxy resin constituted by a solid epoxy resin with one or less hydroxyl group in a molecule, and a liquid epoxy resin with one or less hydroxyl group in a molecule; (B) a curing agent with one or less hydroxyl group in a molecule; and (C) a nanosize silica sol, and contains no compound including two or more hydroxyl groups in a molecule as a resin component. With such a configuration, it is possible to obtain a resin composition and a dry film that provides both high transparency and a low linear expansion coefficient and can be used for an optical waveguide.

Further, in the resin composition for an optical waveguide, the compounding ratio of the solid epoxy resin and the liquid epoxy resin in the epoxy resin (A) is preferably 90 to 70:10 to 30, as a mass ratio. As a result, a resin composition for an optical waveguide with even better optical properties can be obtained.

The content of the nanosize silica sol (C) is preferably 20 mass % to 80 mass %, as converted to a solid fraction of silica with respect to the total content of the resin components. As a result, a resin composition for an optical waveguide with even better optical properties can be obtained.

Silica with an average particle size of 5 nm to 20 nm is used in the nanosize silica sol (C). As a result, a resin composition for an optical waveguide with even better optical properties can be obtained.

Where the curing agent (B) is a cationic curing agent, and the silica sol (C) has a pH of 4.7 to 8.5, a resin composition for an optical waveguide with superior stability in storage can be obtained.

Another aspect of the present invention resides in a dry film obtained by coating the resin composition for an optical waveguide on a base material film followed by drying. By using such a dry film that offers both high transparency and a low linear expansion coefficient, it is possible to obtain an excellent optical waveguide and a photoelectric composite wiring board.

The optical waveguide in accordance with the present invention is constituted by the resin composition for an optical waveguide or the dry film.

The photoelectric composite wiring board in accordance with the present invention is provided with the optical waveguide.

This application claims priority to Japanese Patent Application No. 2011-80559, filed on Mar. 31, 2011, and the contents thereof are incorporated in the present application.

Although the present invention has been adequately and sufficiently explained with respect to the detailed embodiments thereof in order to represent the present invention properly, it will be understood by those skilled in the art that the above-described embodiments can be easily changed and/or modified. Therefore, it is intended that the changes or modifications implemented by those skilled in the art be included in the scope of the claims, provided that the changes or modifications do not depart from the scope of the claims.

INDUSTRIAL APPLICABILITY

The present invention has wide industrial applicability in the technical field of resin compositions for optical waveguides and also dry films, optical waveguides, and photoelectric composite wiring boards using such compositions.

The invention claimed is:

1. A resin composition for an optical waveguide, comprising:
   (A) an epoxy resin constituted by a solid epoxy resin with one or less hydroxyl group in a molecule, and a liquid epoxy resin with one or less hydroxyl group in a molecule;
   (B) a curing agent with one or less hydroxyl group in a molecule; and
   (C) a nanosize silica sol, and
   containing no compound including two or more hydroxyl groups in a molecule as a resin component.

2. The resin composition for an optical waveguide according to claim 1, wherein the compounding ratio of the solid epoxy resin and the liquid epoxy resin in the epoxy resin (A) is 90 to 70:10 to 30, as a mass ratio.

3. The resin composition for an optical waveguide according to claim 1, wherein the content of the nanosize silica sol (C) is 20 mass % to 80 mass %, as converted to a solid fraction of silica, with respect to the total content of the resin components.

4. The resin composition for an optical waveguide according to claim 1, wherein silica with an average particle size of 5 nm to 20 nm is used in the nanosize silica sol (C).

5. The resin composition for an optical waveguide according to claim 1, wherein the curing agent (B) is a cationic curing agent, and the silica sol (C) has a pH of 4.7 to 8.5.

6. A dry film obtained by coating the resin composition for an optical waveguide according to claim 1 on a base material film followed by drying.

7. An optical waveguide constituted by the resin composition for an optical waveguide according to claim 1 or the dry film according to claim 6.

8. A photoelectric composite wiring board comprising the optical waveguide according to claim 7.

* * * * *